Dec. 16, 1969     J. E. HUGHEY     3,484,004

ARTICLE HANDLING DEVICE

Filed Aug. 2, 1967     3 Sheets-Sheet 1

FIG.I

INVENTOR
JOHN E. HUGHEY

BY *Browne, Schuyler & Beveridge*

ATTORNEYS

INVENTOR
JOHN E. HUGHEY

BY Browne, Schuyler & Beveridge

ATTORNEYS

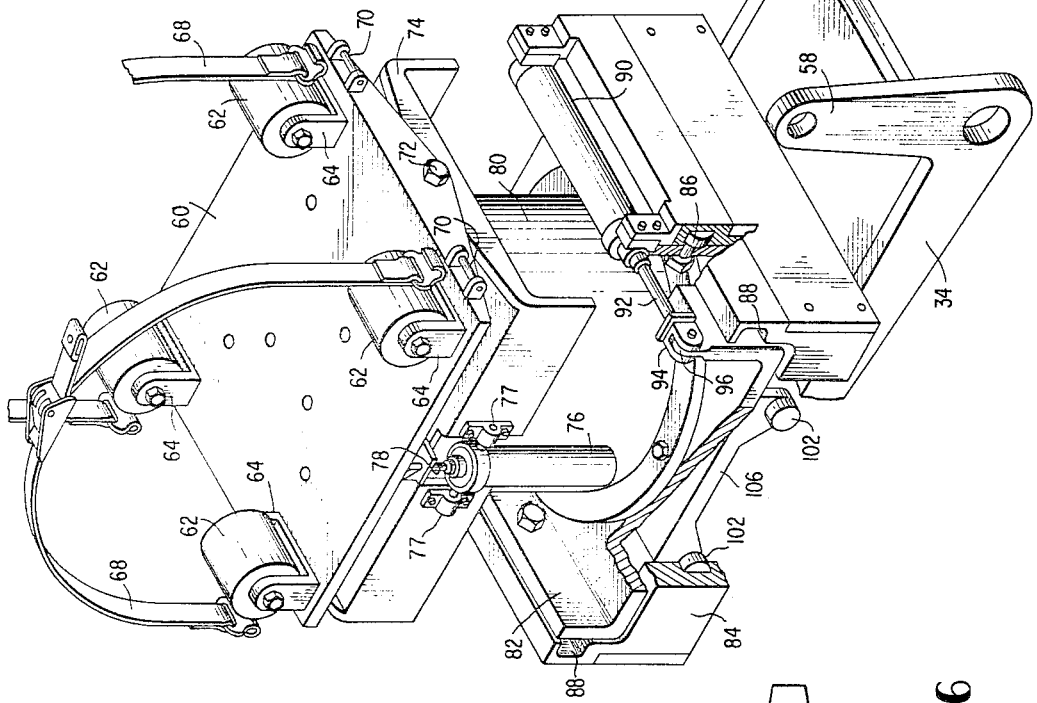
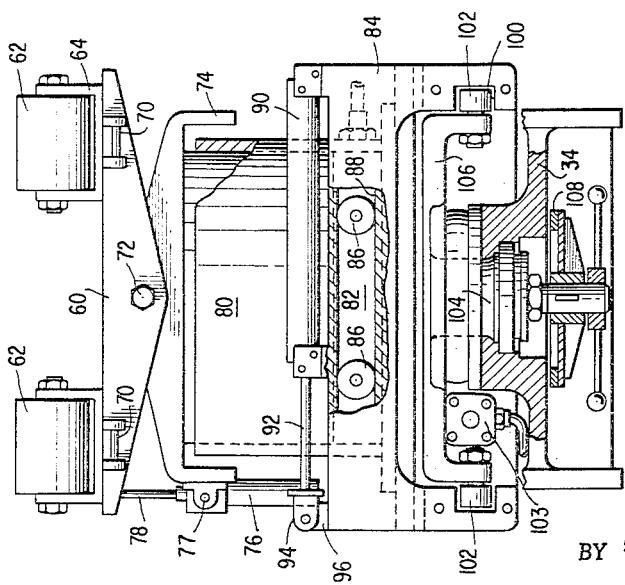

United States Patent Office 3,484,004
Patented Dec. 16, 1969

3,484,004
ARTICLE HANDLING DEVICE
John E. Hughey, Huntsville, Ala., assignor to Brown Engineering Company, Inc., Huntsville, Ala., a corporation of California
Filed Aug. 2, 1967, Ser. No. 661,162
Int. Cl. B66c 23/56, 23/66
U.S. Cl. 214—130
19 Claims

ABSTRACT OF THE DISCLOSURE

An article handling device includes a movable carriage which supports one or more cantilevered load-elevating arms. The load supported by the arms is movable in substantially a straight vertical path due to the manner in which the arms are supported on the carriage. One point on each elevating arm is supported for movement in a path which is the arc of a circle; and, another point on the elevating arm is located between the first point and the vertically movable load and is supported for movement in a path which is the arc of a circle having a radius greater than that of the path of the first point.

The load itself is supported on the load-elevating arm by a positioning head provided with elements including a platform rotatable about a substantially vertical axis, above which are members capable of moving in mutually perpendicular horizontal directions. The load is held on the uppermost of the horizontally movable members and has its longitudinal axis lying generally parallel to one of the mutually perpendicular horizontal directions.

BACKGROUND

This invention relates to material handling apparatus of the type in which a load supporting and elevating arm is cantilevered from a frame and supported in a manner which produces straight line movement of a supported load. Another aspect of the invention involves a load positioning head which is movable about or along several axes in order to permit precise positioning of an elevated load.

The present invention has proven to be of particular value in connection with "weapons loaders" which are load elevating and lowering devices usually used for transporting and loading bombs, fuel tanks, missiles and rocket launchers. However, its contemplated usage extends into many fields involving the handling of diverse types of loads in numerous environments.

In the use of weapons loaders, it is customary and desirable that the load supporting and elevating arm be cantilevered from its supports so that the weapon may be raised to a relatively high elevation without interference between the weapons loader and the airframe. The cantilevered construction also gives the apparatus a low profile which enables it to move beneath an aircraft.

During the normal use of a weapons loader or related load elevating devices, it is important that the carriage or supporting frame be accurately positioned before a load is elevated in order that the load will arrive at the desired location when it is elevated. In the past, the cantilevered arms of weapons loaders have usually been supported by linkages which cause the load to follow an arcuate path as it is being elevated. Such an arcuate path during at least some of its phases will have both vertical and horizontal components. The extent of horizontal movement during elevation will, of course, vary with the height to which the load is elevated, thus complicating the task of accurately initially locating the base or frame of the weapons loader. This difficulty which existed in the prior art is avoided by the present invention which produces substantially straight vertical movement of the load.

Weapons loaders and other work handling apparatus have commonly been provided with what may be called a positioning head for effecting the accurate final positioning of the load. Such positioning heads commonly interconnect a load-supporting cradle to the elevating arm and they permit the load to be moved in mutually perpendicular horizontal directions and rotated about a vertical axis, the latter adjustment being termed a yaw adjustment. The horizontal adjustments have been permitted by members which move with the cradle in mutually perpendicular horizontal directions which are aligned respectively with the longitudinal and transverse axes of the frame which supports the elevating arm. Yaw adjustment has been permitted by pivotally mounting the load supporting cradle on the uppermost of the horizontally movable members so that the cradle may pivot about a substantially vertical axis.

Insofar as longitudinal and transverse adjustments of a load are concerned, the prior art devices have been satisfactory when the axes of the supporting frame are aligned with the axes of the load itself and with the axes of the bomb bay or pylon which is to receive the elevated load. However, when the yaw of the load is varied, the accurate positioning of the weapon in horizontal planes is complicated substantially. For example, if the load is yawed so that its longitudinal axis lies at forty-five degrees to the longitudinal axis of the frame of the weapons loader, an operator who wishes to move the load in a direction solely along its longitudinal axis must produce movement in both of the horizontally movable members. This unnecessary and complicated procedure is avoided by the present invention in which the horizontally movable supporting members are at all times movable in paths which are either longitudinally or transversely aligned with the weapon or other elevated article.

SUMMARY OF THE INVENTION

According to one phase of this invention, an article handling device is provided with a supporting frame or carriage which carries a main load-supporting and elevating arm which is movable with respect to the frame in a given plane. The arm includes an outer point which moves in a straight line and at which a load may be supported. The connection between the frame and the main elevating arm includes means for constraining the movement of a first point of the arm to a first arcuate path which is in an arc of a circle having a central axis which lies perpendicular to the plane in which the elevating arm moves. A second point on the main arm which lies intermediate the first point and the outer point is connected to the frame in a manner whereby its movement is constrained to a second arcuate path which follows the arc of a circle having a central axis which is in fixed parallel relation to the central axis of the first path. The radius of curvature of the path followed by the second point is greater than that of the first arcuate path. The distance between the axes of rotation of the first and second points ($A_1$ and $A_2$) is less than the distance between the first and second points themselves ($P_1$ and $P_2$. The axes of rotation are located so that during movement of the points $P_1$ and $P_2$ toward the straight line path of the outer point $P_3$, there will become an increasing ratio between (a) an incremental angular displacement of the second point $P_2$ about its axis $A_2$ and (b) an incremental angular displacement of the first point $P_1$ about its axis $A_1$. The term "intermediate" when used in describing the location of the second point on the elevating arm is meant to convey that the second point lies closer to the load than the aforementioned first point, and on the same side of the path of movement of the load on the first point.

The preferred manner of supporting the elevating arm on the frame involves supporting arms or other members each of which has spaced apart portions which are pivotally connected respectively to the frame and to the elevating arm. The usual paths of movement of the elevating arm and of the first and second points described above will be in vertical planes. The preferred construction also incorporates significant characterizing features which are discussed in detail in later portions of this specification.

This construction is superior to its predecessors in one sense because the load is raised in a straight line rather than along an arcuate path. As previously mentioned, straight line movement will simplify the opeartor's task of properly locating the apparatus before elevating the load since he need not allow and estimate for the horizontal translation of a load which would occur if the load were to follow an arcuate path.

Another aspect of the invention pertains to the positioning head which may be used to support a load on the elevating arm. The positioning head is constructed so that a supported load may easily be moved along either of its longitudinal or transverse axes without regard to the angular relationship between the supporting frame or the elevating arms and the load. This result is achieved by locating the pivoted connection permitting yaw adjustment at a position between the elevating arm and the relatively movable members which permit movement of the weapon along its longitudinal and transverse axes.

In the positioning head there is an elevatable base member, a cradle or other load support member which supports a load so that the longitudinal axis of the load is fixed with respect to the load support member, and a series of at least three members which are interconnected to support the load support member on the elevatable base member. The first of the three members is pivotally connected to the elevatable base member. The second of the three members is supported on the first member for relative linear movement with respect to the first member; and the third of the three members is supported on the second member for relative linear movement which is transverse to the path of the second member. The load support member is attached to the third member so that the longitudinal axis of the load will be aligned with the path of either the second or third members. Due to this arrangement of the elements, any movement of the second or third members will be aligned either transversely or longitudinally with the load. This is advantageous since only one of the second or third members needs to be moved with respect to its support when it is necessary to move the load longitudinally or transversely.

This invention involves a mechanical linkage per se, in which motion in an arcuate path at one point on an arm is converted into linear motion at another point on the arm by supporting a midportion of the arm by means which results in movement of the midportion through an arcuate path having a radius greater than the radius of the aforesaid arcuate path.

On the basis of the preceding comments, it will be appreciated that one principal object of the invention is to provide an article handling device in which a load may be supported on a cantilevered arm and moved, in a straight line path in order to avoid guesswork in the initial positioning of the load before it is elevated. Another object is to provide a simple and effective mechanical linkage for creating such movement.

Another principal object of this invention is to facilitate the accurate positioning of an elevated load by the provision of a positioning head in which horizontal positional adjustments may always be easily made along axes which are aligned longitudinally or transversely of the load regardless of the particular position to which the load is yawed.

The satisfaction of these and other objects is a result of this invention, a single embodiment of which is disclosed in the drawings and the following description.

THE DRAWINGS

FIG. 4 is a perspective view of the article-positioning head of this invention;

FIG. 5 is an elevational view partially in section of the positioning head shown in FIG. 4; and FIG. 6 is a diagrammatic view showing the relationship between a weapon and a weapon-positioning head.

DESCRIPTION OF THE ILLUSTRATED EMBODIMENT

Figure 1:
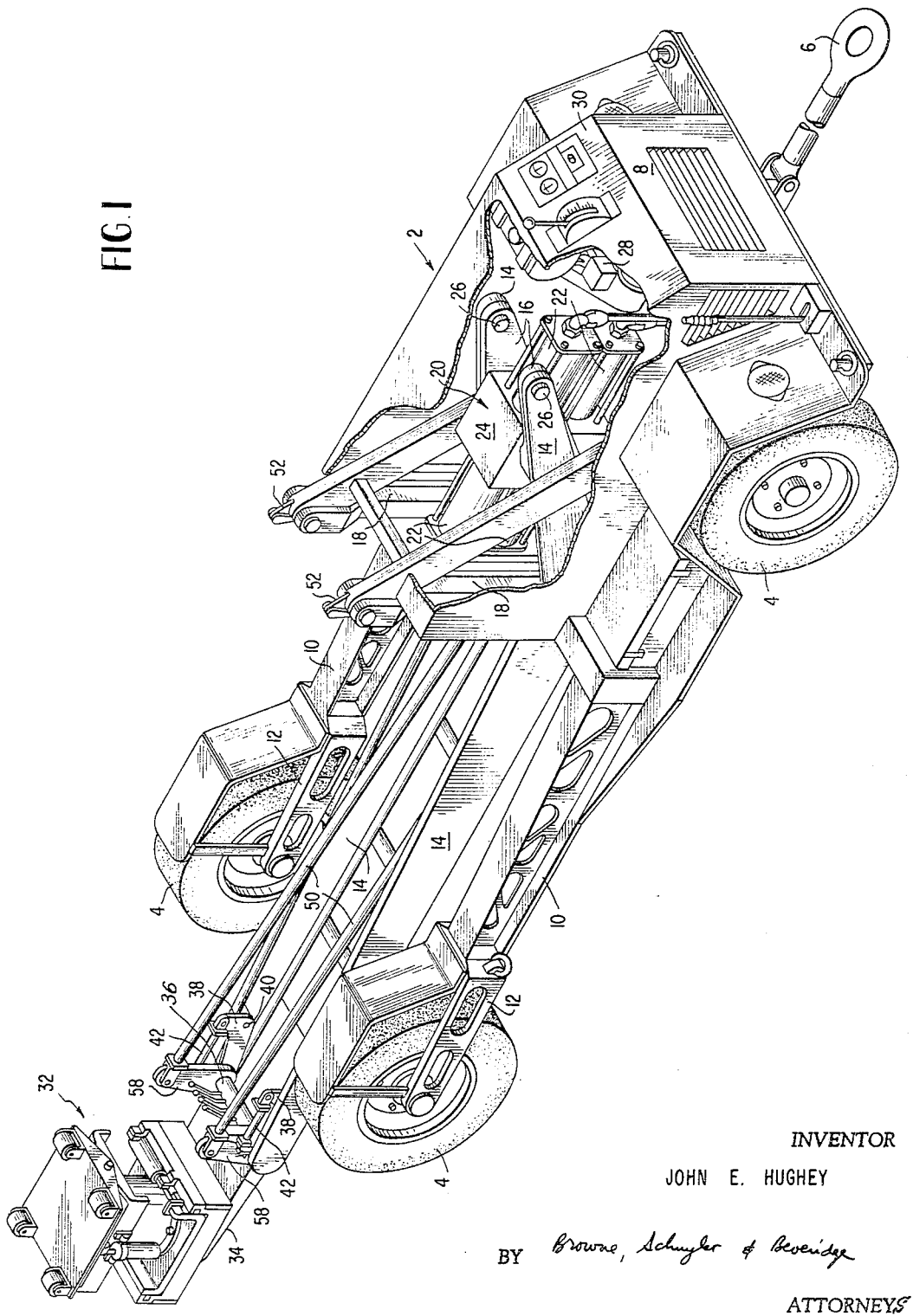
FIG. 1 is a perspective view of a weapons loader which employs the principles of this invention.

Referring to FIG. 1, it will be seen that the load handling apparatus includes a frame or movable carriage 2 which is the supporting frame for the load elevating mechanisms. As is usual in apparatus of this type, the carriage 2 is supported on wheel 4, and may be towed by a conventional traction vehicle by means of a towing eye 6. The carriage 2 is generally U-shaped in horizontal planes with the forward body portion 8 constituting the base of the U, and the rearwardly extending beams 10 forming the legs of tthe U. The beams 10 have forked portions 12 at their rearward ends in order to accommodate the rear wheels 4.

The principal support for an elevated load in this apparatus is provided by the two parallel elevating arms 14 which extend rearwardly from the forward body portion 8 of the carriage 2 between and parallel to the beams 10. These elevating arms 14 are attached to the carriage or frame by the pivoted support arm members 16 and 18 which will be described in greater detail in connection with FIG. 3. Movement of the support arm member 16 is accomplished by means of a hydraulic motor generally designated 20. This motor includes two pairs of hydraulic rams 22 which drive a conventional rack and pinion mechanism in the housing 24 in order to impart rotational movement to a shaft keyed to both of the support arm members 16. The connection between the elevating arms 14 and the driven pivoted member 16 is at the bearings 26.

A small internal combustion engine 28 is provided on the carriage to drive a standard hydraulic pump which furnishes the pressurized fluid necessary to operate the hydraulic motors used in the apparatus. The controls for the internal combustion engine 28, the pump and the various hydraulic motors are located on the forward panel 30 of the carriage 2.

The structure for supporting a weapon or other article is the positioning head generally designated 32 which is attached to the outermost end of the elevating arms 14. The positioning head 32 which is described in greater detail in connection with FIGS. 4 and 5, includes a base member 34 which is attached to the elevating arm 14. The connection between the base member 34 and the elevating arm 14 is made through the plates 38 which are pivotally connected to the arm 14 at 40. Small hydraulic rams or other adjustable devices 42 are used to effect a slight relative movement between the plates 38 and the arms 14. The pin 36 which supports the base member 34 is pivotally connected to the plate 38.

As previously described, one of the principal purposes of this invention is to provide an article handling device which suppotrs a load in cantilevered fashion and has the capability of moving the load along a substantially straight line path, preferably in a vertical direction. This vertical movement is achieved in the present apparatus by utilization of the support arm members 16 and 18 which respectively support two points on each of the elevating arms 14. The two points on each elevating arm 14 move through arcuate paths which lie in arcs of circles which are fixed with respect to the frame 2. The supported point on the elevating arm 14 lying closest to the positioning head 32 is guided by the support arm member 18 for movement in an arc having a greater radius of curvature than that of the other arcuate path.

Figure 3:
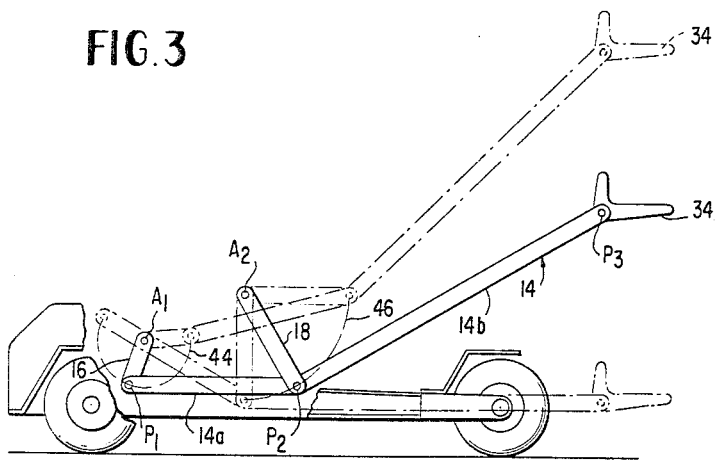
FIG. 3 is a diagrammatic side elevation showing the various linkages which support the cantilevered arm of the preferred embodiment.

The principles of operation of the linkages supporting the elevating arms 14 are best understood by reference to the diagrammatic illustration in FIG. 3, where the arm 14 is shown in its lowermost, intermediate and uppermost positions. The intermediate position is indicated in solid lines. Here, it will be seen that the arm 14 includes two rigidly interconnected portions 14a and 14b. The effective length of the arm portion 14a is the distance between the point $P_1$ which is its point of connection to the supporting arm 16, and the point $P_2$ which is its point of connection to the supporting arm 18. The line $P_1$–$P_2$ extending between these two points lies at an obtuse angle to the effective axis of the arm portion 14b which extends from the point $P_2$ to the point $P_3$ where the vertically movable load is attached.

When the elevating arm 14 is at its lowermost position, the line $P_2$–$P_3$ is horizontal and the line $P_1$–$P_2$ is inclined to intersect the horizontal axis $A_1$ about which the supporting arm 14 is pivoted. Energization of the hydraulic motor 20 which was discussed in connection witht FIG. 1, will impart rotary movement to the supporting arm 16 and move the point $P_1$ through an arcuate path 44 about the axis $A_1$. During elevation of the load, this path is in a counterclockwise direction as viewed in FIG. 3.

As a result of the movement of the point $P_1$ by the hydraulic motor, the point $P_2$ is also moved through the arcuate path 46 which has only upward and horizontal components during the elevation of a load.

The effective lengths of the supporting arms 16 and 18 and the locations and radii of the paths 44 and 46 may be determined experimentally for any particular situation. There are several characteristics of their size, location and orientation which may be useful in the construction of apparatus according to this invention. As stated above, the supporting arm 18 has a greater effective length than the supporting arm 16. Each of the arcuate paths 44 and 46 has its major portions on a same side of a plane which includes the central axes $A_1$ or $A_2$. The path 44 of point $P_1$ includes both downward and upward components during either the elevation or lowering of an article on the arm 14. This path 44 is located in the two quadrants below the axis $A_1$ which are defined by vertical and horizontal planes parallel to and extending through the axis $A_1$. Contrasted to this, the supporting arm 18 moves so that its connection to the elevating arm 14 at $P_2$ moves through the arcuate path 46 in which its vertical components are directed in a same direciton as the movement of the outer point $P_3$. The path 46 is only in the quadrant defined by vertical and horizontal planes which are parallel to and include the axis $A_2$ which lies below the axis $A_2$ and toward the vertical line of movement of point $P_3$. The locations of the axes $A_1$ and $A_2$ and the effective lengths of the supporting arms 16 and 18 are such that point $P_1$ moves through an arc having an angular extent which is greater than the angular extent of the arc 46. The angular movement of point $P_1$ may be at least two times as great as that of the point $P_2$.

Within the bounds of this invention, there is a great variety of dimensional and positional variations which are capable of producing vertical straight line movement of a supported load. One suitable arrangement exists when the angle formed by the lines $P_1$–$P_2$ and $P_2$–$P_3$ is 150° and in which the line $P_2$–$P_3$ is horizontal when the line $P_1$–$P_2$ intersects the axis $A_1$. Under these circumstances, the use of a supporting arm 18 having an effective length twice that of the supporting arm 16 and in which the effective length of the arm portion 14b is twice that of the arm portion 14a will produce substantially straight line movement at the point $P_3$.

During the elevation of a load, it will be apparent that the inclination of the arm portion 14b is constantly changing. In order to prevent a similar inclination of the load, it is desirable to provide linkages which will maintain the load in a fixed orientation as it is being elevated.

Figure 2:
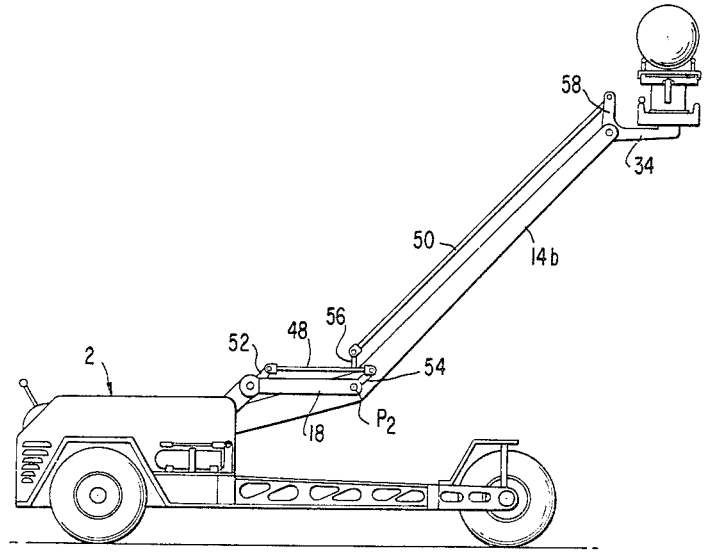
FIG. 2 is a side elevation of the weapons loader of FIG. 1, in which the positioning head and supported load are shown in their elevated positions.

The presently-described load handling device utilizes parallelogram linkages for establishing a fixed orientation of the load on the positioning head 32. One suitable linkage is shown in FIG. 2 in which rods 48 and 50 lie parallel respectively to the supporting arm 18 and the portion 14b of the elevating arm. The rod 48 is pivotally attached at its opposite ends to the stationary member 52 on the loader frame and to the outer end of a crank 54 which is pivoted at the point $P_2$ on the arm 14. Rigidly interconnected to the crank 54 is another crank 56 which also pivots about the point $P_2$ due to their connection to a common shaft. The rod 50 of the outer parallelogram linkage is pivotally connected to the outer end of the crank 56 and to an upstanding portion 58 of the base member 34 of the positioning head. With the parts interconnected in the manner indicated, it will be appreciated that the dual parallelograms which extend from the frame 2 to the base member 34 will keep the base member 34 in a fixed orientation throughout all stages of elevation of the elevating arm 14.

As indicated in the background portion of this specfication, article handling devices used for weapons must be capable of positioning the weapon quite accurately with respect to a bomb bay or a pylon on the outer portion of an aircraft. Such positioning is greatly facilitated by the aforementioned linkages which produce vertical movement of the weapon. Fine adjustments are desirable and customarily have been provided by the utilization of a positioning head which produces relatively small movements of the cradle or other load support. The positioning head of this invention is illustrated generally at 32 in FIG. 1 and is shown in detail in FIGS. 4 and 5.

The weapon itself is supported in a cradle which includes a plate 60 and a series of four rollers 62 which are rotatably supported on the members 64. Straps 68 with conventional buckles are secured to the plate 60 by pins 70 in order to hold a weapon securely within the cradle. When a weapon is located on the rollers 62, its longitudinal axis will remain fixed with respect to the cradle and will extend parallel to the axis of rotation of the rollers 62.

The pitch of a supported weapon, i.e. the inclination of its longitudinal axis may be varied due to the pivotal interconnection at 72 between the plate 60 and the member 74. A small hydraulic ram 76 is supported on the member 74 by bearing blocks 77 and it has a rod 78 which is connected at its upper end to an extension of the cradle plate 60. The member 74, the cradle plate 60 and the weapon are vertically movable with respect to the remainder of the positioning head by means of a relatively large hydraulic cylinder 80 which is supported at its lower end by a horizontally movable member 82. The cylinder 80 is constructed to prevent angular movement between the members 60 and 82. The vertical movement which it produces is especially desirable when raising weapons into a bomb bay.

The horizontally movable member 82 is supported on another horizontally movable member 84 by rollers 86 which ride in a trackway 88 in the member 84. Relative movement between the members 82 and 84 is effected by a reciprocating hydraulic motor 90 which has its body anchored to the member 84 and which has a rod 92 provided with a yoke 94 which is attached to an upstanding projection 96 of the member 82.

The lower horizontally movable member 84 includes another trackway 100 which receives the rollers 102 in the manner illustrated in FIG. 5. A reciprocating hydraulic motor 103 acts between the members 84 and 106 to produce movement of the rollers 102 in the trackway 100.

Recalling that the longitudinal axis of the weapon is parallel to the axis of the rollers 62, it will be realized that actuation of the hydraulic motor 90 and the consequent horizontal movement of the member 82 will always produce exclusively longitudinal movement of the weapon. Similarly, actuation of the hydraulic motor 103 will result in movement of the member 84 and the weapon in a horizontal direction aligned transversely to the weapon.

In addition to providing adjustments for pitch, longitudinal position and transverse position, the present positioning head also has provisions for adjusting the yaw of the weapon. Yaw is the orientation of the weapon about an axis which is angularly related to the paths of movement of the members 82 and 84. The provisions permitting yaw adjustment are illustrated in FIG. 5 and include a vertically extending shaft 104 which pivotally interconnects the member 106 with the base plate 34. Suitable bearings are provided to facilitate the yaw adjustment by such rotational movement, and a normally engaged "dead-man brake" is provided at 108 to lock the article in a desired position of yaw.

The described positioning head differs from the prior art in the principal respect that the means permitting yaw adjustment is interposed between the base member 32 and the two movable members 82 and 84. Therefore, any actuation of either the hydraulic motors 90 or 103 will produce either purely longitudinal or purely transverse movement of the load regardless of the angular position of the weapon with respect to the arms 14 and the frame 2.

In previous weapons loaders, the pivotal connection permitting yaw adjustment has been located above horizontally movable members corresponding to those illustrated at 82 and 84 in this specification. Movement of the members such as 82 and 84 were always aligned with respect to the ground-traversing frame of the loader and not with respect to the weapon. For example, when a weapon w was yawed to the position illustrated in solid lines in FIG. 6, a skilled operator who wished to move the weapon along its transverse axis had to actuate the hydraulic motors for both of the horizontally movable members. Using the presently described apparatus, transverse adjustment of the weapon may be effected by actuating only the hydraulic motor 103 regardless of the yaw angle.

This improved construction of the positioning head also simplifies the manipulation of the ground-traversing frame of the weapons loader into a position adjacent an aircraft. Using prior art weapons loaders, it was naturally easier to effect the longitudinal and transverse adjustments of the weapon if the frame of the weapons loader was first aligned with the axis of the pylon or bomb bay. Using the positioning head described herein, such location of the carriage of the weapons loaders is unnecessary since the weapon may always be conveniently adjusted longitudinally and transversely throughout all yaw angles.

Of course, the various concepts involved in this specification and the apparatus disclosed herein susceptible to many variations from the single illustrated embodiment. Diverse types of load supporting or engaging means may of course be provided in lieu of the article positioning head described herein. For example, a conventional lifting fork such as those used on fork lift trucks may be used. It is contemplated that this invention will find utilization in many fields of the material handling arts in which it is desirable to support a load at the outer end of a cantilevered arm and move the load in a vertical straight line path. The positioning head may be modified for use in any apparatus in which there are yaw and horizontal adjustments. The bounds of the invention lie within the spirit of the claims which follow.

I claim:

1. An article handling device capable of moving an article in a straight line path comprising a frame, an arm supported on said frame for movement in a given plane and having a load-supporting point which is capable of moving in a straight line path, means attached to said frame for constraining the movement of a first point on said arm to a first arcuate path which is in an arc of a circle having a first central axis which is perpendicular to said given plane and fixed with respect to said frame, said arm having a second point which lies intermediate said first point and said load-supporting point, means on said frame operatively connected to said second point for constraining movement of said second point to a second arcuate path which is an arc of a circle having a second central axis which is parallel and stationary with respect to said first central axis, said second arcuate path having a radius of curvature which is greater than the radius of curvature of said first arcuate path, the distance between the straight line path and the second arcuate path being less than the distance between the straight line path and the second axis, said axes being spaced apart a distance less than said first and second points and being located to provide during movement of the first and second points toward said path an increasing ratio between (a) an incremental angular displacement of the second point about the second axis and (b) an incremental angular displacement of the first point about the first axis, said arcuate paths and said points being located and dimensioned to produce substantially straight line movement of said load-supportion point.

2. An article handling device according to claim 1 in which each of said first and second arcuate paths is spaced in a same direction from its respective plane which is oriented normal to said straight line path and includes the central axis of the respective arcuate path, said second arcuate path lying exclusively on one side of a plane which is parallel to and includes said second axis and is parallel to said straight line path.

3. An article handling device according to claim 1 having a load positioning head connected to the load-supporting outer point on said arm, said load positioning head comprising a base member connected to said arm, an article support for receiving and supporting an article with its longitudinal axis fixed with respect thereto, first second and third members arranged to connect said article support to said base member, means supporting said first member on said base for rotation with respect thereto about a pivotal axis, means supporting said second member on said first member for relative movement along one linear path angularly related to said pivotal axis, means supporting said third member on said second member for relative movement in another linear path transverse to said one path and angularly related to said pivotal axis, means connecting said article support to said third member in a position where said longitudinal axis lies generally parallel to one of said linear paths.

4. An article handling device according to claim 1 in which the first arcuate path is in a vertical plane and has portions lying on both sides of another vertical plane which is parallel to and includes said first central axis, said second arcuate path lying only on one side of a further vertical plane which is parallel to and includes said second central axis.

5. An article handling device according to claim 1 in which at least the major portions of the first and second arcuate paths are on a same side of a plane which is parallel to and includes both the first and second central axes.

6. An article handling device according to claim 5 in which the first arcuate path is in a vertical plane and has portions lying on both sides of another vertical plane which is parallel to and includes said first central axis, said second arcuate path lying only on one side of a further vertical plane which is parallel to and includes said second central axis.

7. An article handling device according to claim 1 in which the means for constraining movement of the first point and the means for constraining movement of the second point are members each of which is pivotally connected to said frame and said arm.

8. An article handling device according to claim 7 in which said given plane is substantially vertical and those portions of said arm adjacent said load-supporting point are cantilevered from said frame.

9. An article handling device according to claim 1 in which said given plane is substantially vertical and those portions of said arm adjacent said load-supporting point are cantilevered from said frame.

10. An article handling device according to claim 9 in which at least the major portions of the first and second arcuate paths are on a same side of a plane which is parallel to and includes both the first and second central axes.

11. An article handling device according to claim 1 in which said given plane is substantially vertical and in which a line between said first point and said second point intersects said first central axis when a line between said second point and said load-supporting point is horizontal.

12. An article handling device according to claim 11 which, when in the position described in claim 11, a line between said second point and said second central axis is substantially vertical.

13. An article handling device according to claim 12 in which a line between said first point and said second point forms an obtuse angle with a line between said second point and said load-supporting point.

14. An article handling device according to claim 1 in which the first arcuate path followed by said first point is in a first plane parallel to said given plane and in both of a given two quadrants defined by mutually perpendicular lines which intersect said first central axis in said first plane, one of said mutually perpendicular lines being perpendicular to said straight line path of the load-supporting point, said given two quadrants being located on a same side of said one of the mutually perpendicular lines.

15. An article handling device according to claim 1 in which the second arcuate path followed by said second point is exclusively in a single quadrant in a second plane parallel to said given plane, said single quadrant being defined by mutually perpendicular lines which intersect said second central axis in said second plane, one of said mutually perpendicular lines being perpendicular to said straight line path of movement of said load-supporting point, said single quadrant lying between said second central axis and said load-supporting point.

16. An article handling device according to claim 15 in which the first arcuate path followed by said first point is in a first plane parallel to said given plane and in a given two quadrants defined by mutually perpendicular lines which intersect said first central axis in said first plane, one of said mutually perpendicular lines which intersects said first central axis being perpendicular to said straight line path of movement of said load-supporting point, said given two quadrants lying on a same side of said one of said mutually perpendicular lines which intersects said first central axis.

17. An article handling device according to claim 16 in which each of said first and second arcuate paths lies on a same side of a line drawn through its respective central axis in perpendicular relation to said straight line path of the load-supporting point.

18. A mechanical linkage for converting rotary motion to linear motion comprising a rigid arm having an outer load-bearing point movable in a straight line path, means for constraining a first point on said arm for movement in a first arcuate path having a fixed first central axis and a constant first radius, a second point on said arm intermediate said first point and said second point, means for constraining said second point on said arm for movement in a second arcuate path having a fixed second central axis parallel to said first axis and a constant second radius, said second radius being greater than said first radius, the distance between the straight line path and the second arcuate path being less than the distance between the straight line path and the second axis, said axes being spaced apart a distance less than said first and second points and being located to provide during movement of the first and second points toward said path an increasing ratio between (a) an incremental angular displacement of the second point about the second axis and (b) an incremental angular displacement of the first point about the first axis, said arcuate paths and said points being located and dimensioned to produce substantially straight line movement of said outer point.

19. A mechanical linkage according to claim 18 in which each of said first and second arcuate paths is spaced in a same direction from its respective plane which is oriented normal to said straight line path and includes the central axis of the respective arcuate path, said second path lying exclusively on one side of a plane which is parallel to and includes said second axis and is parallel to said straight path.

References Cited

UNITED STATES PATENTS

| | | | |
|---|---|---|---|
| 2,523,734 | 9/1950 | Stephenson et al. | 214—1 |
| 2,613,822 | 10/1952 | Stanley | 214—1 |
| 3,087,630 | 4/1963 | Karnolo et al. | 214—1 |
| 3,215,292 | 11/1965 | Halls | 214—770 |
| 3,209,930 | 10/1965 | Derruppe | 214—770 |
| 3,281,118 | 10/1965 | Krlianovich | 214—1 |
| 1,579,170 | 3/1926 | Wilkinson et al. | 74—103 X |

HUGO O. SCHULZ, Primary Examiner

U.S. Cl. X.R.
74—103; 214—1, 770